Oct. 23, 1962           H. H. PLATT           3,059,876

VERTICAL TAKE-OFF AIRPLANE

Filed July 3, 1958

INVENTOR.
HAVILAND H. PLATT
BY
*his attorney*

United States Patent Office 3,059,876
Patented Oct. 23, 1962

3,059,876
VERTICAL TAKE-OFF AIRPLANE
Haviland H. Platt, 19 E. 53rd St., New York, N.Y.
Filed July 3, 1958, Ser. No. 746,408
10 Claims. (Cl. 244—7)

The present invention relates to airplanes and more particularly to airplanes known as vertical take-off airplanes in which thrust devices, such as propellers or jets with power enough to lift the aircraft vertically, are provided, and in which provision is made for directing the thrust vertically for take-off and landing, and for rotating the thrust means into a generally horizontal direction for forward flight.

Hitherto vertical take-off airplanes have been proposed with various types of instrumentalities for effecting and controlling the rotation of the thrust vector from the vertical to the horizontal attitude and vice versa. For example, in a certain type of airplane commonly known as the "tail sitter," the entire arplane is rotated, the thrust producing devices, whether propellers or jets, remaining fixed relative to the fuselage. The moment needed for rotating the airplane, and with it the thrust vector, is commonly provided by tail fins or other airfoil surfaces reacting with the propeller slipstream or the jet discharge.

In another type of projected airplane construction, the fuselage and wings remain stationary in relation to each other, in the customary attitude, while the lifting rotors, propellers or jets are mounted for rotation between the vertical and horizontal thrust attitudes.

In still another proposed type of construction, known as the "tilt wing VTOL," the fuselage remains in the generally horizontal attitude while the wing and the thrust-producers rotate as a unit. In this category may be included also designs in which a part of the wing is fixed and a part rotates with the thrust devices.

In all the airplane constructions described above, there is a very serious problem in the actuation and control of the tilting function, namely, during the tilting-transition a strong aerodynamic resistance to tilting is developed. If this resistance is overcome by application of power from the fuselage, a prohibitive pitching displacement (operative on the fuselage) is caused by the torque-reaction. Previously considered means for overcoming this difficulty include: controllable vanes in the slipstream; cyclic rotor-pitch control; auxiliary directional jets at the tail; and auxiliary directional propellers at the tail. Each of these expedients is objectionable for one or more of the following reasons: marginal effectiveness, mechanical complexity, excessive weight, excessive power consumption.

One object of the present invention is to avoid the difficulties inherent in the "transition" of vertical take-off airplanes, as enumerated above, by the application of a novel principle whereby a tilt-moment greater than any hitherto contemplated is provided without serious complexity and without the need for additional weight or power.

Another object of the present invention is surplus controlability of vertical take-off airplanes in all flight phases, to achieve vertical take-off and full controlability throughout the transition without impairment of forward flight performance in comparison with comparable conventional fixed wing airplanes.

The present invention also provides an advantageous structural arrangement of the components of a vertical take-off airplane.

The novel principle which constitutes the central core of the present invention resides in the use of two or more thrust units so spaced relative to the axis about which the transition tilting is to take place, that a differential change of thrust-force between them gives rise to a moment directed to cause tilting in the desired direction.

The present invention may be embodied in many forms. One embodiment of the present invention is described hereinafter and is illustrated diagrammatically in the accompanying drawings.

In the accompanying drawing, in which like reference characters indicate like parts, FIGURE 1 is a diagrammatic plan view of an airplane, representing one embodiment of the invention, having its thrust-producers shown in position for forward flight.

The airplane shown is a four-engined airplane with wing and propellers (or thrust-producers) mounted to tilt freely on the fuselage, as proposed in my co-pending application Serial No. 622,605, filed November 16, 1956.

Figure 2:
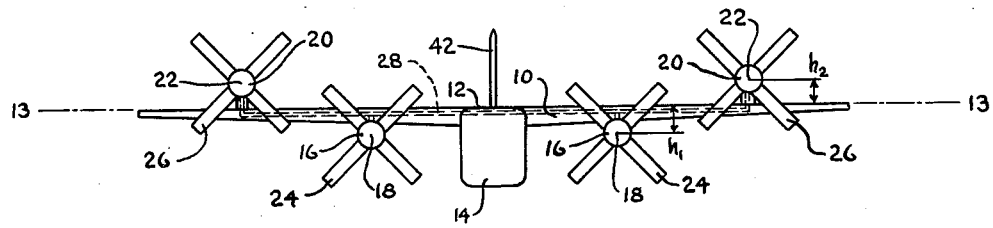
FIGURE 2 is a front elevation of the airplane shown in FIGURE 1.

The wing 10 is freely pivoted at 12 on fuselage 14, about an axis 13 passing preferably close to the center of gravity of wing 10 together with everything carried on it. Two engines 16, preferably of the shaft-turbine type, are fixed on wing 10 on either side of fuselage 14 with their output shaft axes 18 located below pivot-axis 13 (in FIGURE 2) and forward of pivot-axis 13 in the attitude shown in FIGURE 3; the distance between each thrust-axis 18 and fuselage pivot-axis 13 being designated $h_1$. Two additional engines 20 are fixed on wing 10 with their output shaft axes 22 located above pivot-axis 13 (in FIGURE 2) and rearward thereof in the attitude shown in FIGURE 3; the distance between each axis 22 and axis 13 being designated $h_2$. In the embodiment illustrated, the engines 20 are outboard of engines 16. They may however optionally be placed at the same distance from the fuselage with the propellers overlapping, or with any intermediate or reversed spacing.

Engines 16 are arranged to drive propellers 24 through any suitable reduction gearing, the propellers being equipped with mechanism for changing the pitch of their blades in accordance with any suitable pitch-control device known in the art or hereafter developed. Propellers 26 are similarly driven by engines 20. The engines and propellers may all be provided with suitable fairings for reducing aerodynamic drag, as is customary in the art.

Figure 1:
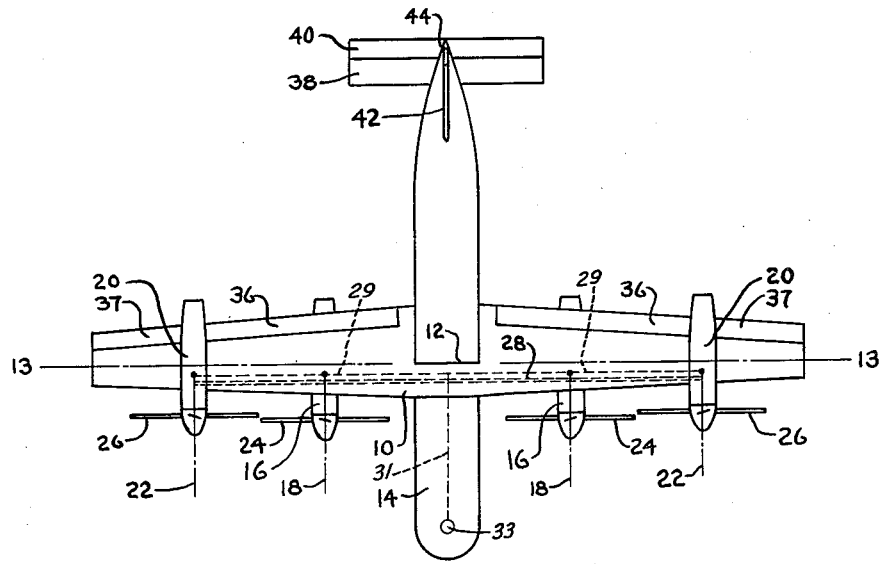

All four engines 16 and 20 may be interconnected by shafting 28 (FIGURE 1), which may include suitable gears, universal joints and overrunning clutches, (not shown), in a manner well known in the art. The shaft interconnection is optional, being a safety feature enabling all propellers to be driven after one or more engines have failed. If the safety feature is not required, the entire shafting 28 may be omitted, or only the portion of the shafting between engines 16 may be omitted, retention of the interconnections between engines 16 and 20 on each side serving a function in amplifying available control, as will be explained more fully.

Provision may be included, as taught in my co-pending application Serial No. 622,605, or otherwise, for locking wing 10 in normal airplane flight position during the forward flight regime and for applying a moment to trim the fuselage if necessary during take-off, landing and transition. Wing 10 may be equipped also with flaps 36 and ailerons 37, and fuselage 14 may carry the conventional empenage with horizontal stabilizer 38, elevator 40, vertical fin 42 and rudder 44; all of which may be operated by conventional control means, for control in the normal manner during forward flight, but which control means are substantially ineffective during the vertical phases of flight. Any conventional landing gear (not shown), preferably of the retractable type, may be used.

The throttles of all four engines are under control of the pilot, both individually and collectively, as are also the pitches of the four variable-pitch propellers. The control means for effecting these control actions are indicated diagrammatically by the dotted lines 29 and 31 extending between the engines 16 and 20 and to the pilot's station 33. Devices for the purpose are well known in the art in many forms, with mechanical, hydraulic, pneumatic and electrical actuations.

Figure 3:
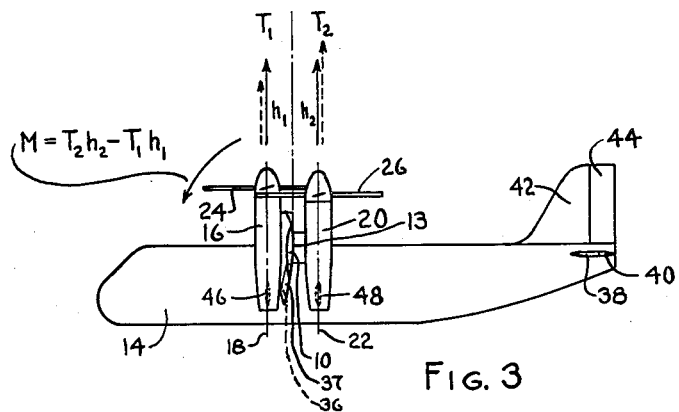
FIGURE 3 is a side elevation of the airplane illustrated in FIGURE 1 with its wing and thrust-producers tilted, however, into position for take-off and landing.

The projections on a plane perpendicular to the tilt-axis 13 of the vertical thrust-vectors $T_1$ and $T_2$ of the two sets of propellers 24 and 26 are indicated in FIGURE 3. When these vector projections are of equal length, as shown by the solid arrows, representative of equality of propeller thrust, the wing 10 remains in the position shown, since there is no unbalanced tilting moment. When however the thrust of propellers 26 is increased and/or that of propellers 24 is reduced (relative to each other), vector $T_1$ shortens and $T_2$ lengthens, as indicated by the dotted arrows. A moment tending to tilt wing 10 into forward flight attitude, as indicated by the arrow M, is thus developed; its value being expressed algebraically, $$M = T_2 h_2 - T_1 h_1$$

Moments thus attainable are far greater than those derivable from auxiliary devices such as have been previously proposed and, with suitable arrangement of control instrumentalities, involve little or no increase in weight, impairment of lift or consumption of power.

If shafting 28 is omitted, so that there is no shaft interconnection, control of vectors $T_1$ and $T_2$ is effected by combined pitch and throttle change, so as to increase the thrust of engines 20 and reduce the thrust means of engines 16 (relative to each other). This requires a certain amount of surplus power capacity above that required for hovering. Normally, such surplus power is provided for climbing performance. Since the initial part of transition is preferably made without climbing, the climbing power reserve is available for the tilting operation, with no sacrifice of power capacity.

However, if greater power reserve is considered important, the outboard portions of shafting 28 may be retained to interconnect the two engines 16 and 20 on each side. The control of thrust-vectors $T_1$ and $T_2$ is then effected by reducing the pitch of propellers 24 and increasing that of propellers 26. In this case the engine power output is substantially unaffected by tilt-control. The inclusion of the cross-connecting portion of shafting 28 serves, if required, the function of safety in allowing one, two or three engines to drive without an upsetting tendency.

Flaps 36 may be used also to augment control of the tilting of wing 10. Thus, the moment derived from the flaps may be added to that derived from the thrust differential, or the thrust differential may be used for trim and flaps 36 for control.

The flaps 36 and ailerons 37, being in the slipstreams of propellers or thrust-producers 26 and 24, are effective for directional control in vertical flight. Two additional control surfaces for directional control in the vertical phases of flight are illustrated by the dotted outlines 46 and 48 in FIGURE 3. These are optional. They have the advantage of being in unstalled flow regions during the transition from vertical to forward flight when the trailing edge flaps 36 may have impaired effectiveness due to wing stall. Still other optional provisions for directional control in the vertical and transitional flight phases, are vanes in the engine exhaust streams and controllable jets near the wing tips, powered from the engines or otherwise.

Roll-control in vertical flight is obtained mainly by differential throttle actuation between the engines on the two sides, if the central part of shafting 28 (between engine-shafts 18) is not present, and mainly by differential pitch-actuation if it is present.

In forward flight, wtih the wing locked in place in relation to the fuselage, the vertical flight controls may be locked in neutral and reliance may be placed on the conventional instrumentalities of elevator, rudder and ailerons and flaps. Alternatively, the elevator and rudder may be omitted, and the throttle and propeller controls may be relied on for forward flight control as well as for vertical flight control.

The wing may be fixed on the fuselage, with the propellers alone tiltable or with the engines and propellers tiltable.

A part only of the wing may tilt with the engines and propellers while a part of the wing is fixed.

The thrust units may (optionally) be arranged also to tilt differentially on the two sides of the fuselage, for yaw control.

The effect of the flaps may be augmented so as to deflect the slipstream in normal vertical flight, thereby reducing the angle through which the propellers need be tilted for any control purpose, as, for instance, for vertical take-off or landing.

A lesser number of engines may be used with the interconnecting shafting 28. Thus, the two outboard engines may be omitted, and the outboard propellers driven through the shafting, or a single engine connected in shafting 28 may drive all the propellers.

A two-propeller arrangement may be used, with the propeller-axes one above the other, in the vertical fore-and-aft median plane through the fuselage center-line; with or without overlapping blade discs.

Jet or rocket engines may be substituted for shaft turbines and propellers.

With jet or rocket engines the problem of propeller-clearance is absent and therefore a preferred arrangement for four engines is one in which the engines are placed vertically above each other on each side of the fuselage.

The invention provides advantages over the pitch and tilt control methods heretofore proposed, in that a more powerful tilting moment is available without weight or power sacrifice and without disturbance of fuselage attitude.

The arrangement of the engines 16 and 20 relative to the wing, also gives the structural advantage of permitting the engines to be mounted in pods above and below the wing, whereby the structure of the wing is simplified and lightened in comparison with the more usual arrangement having the engines aligned in the wing.

The present invention may be embodied in other specific forms. It is therefore desired that the scope of the invention be gauged by the appended claims rather than by the foregoing description and accompanying drawings.

Having illustrated and described my invention, I claim the following:

1. In an aircraft, a fuselage, a pivot on said fuselage, the axis of said pivot extending transversely of said fuselage, a wing mounted on said pivot and arranged for tilting about said axis, a plurality of thrust-producers mounted on said wing with their thrust-lines extending generally in a fore-and-aft direction in respect to said wing, the thrust-line of at least one of said thrust-producers being offset relative to the thrust-line of at least one other of said thrust-producers transversely of said pivot axis, and control means adapted differentially to vary the thrusts of said offset thrust-producers, whereby actuation and control of the tilting of said wing in respect to said fuselage may be effected by differential change in the magnitudes of the thrusts of said offset thrust-producers.

2. In an aircraft, a fuselage, a pivot on said fuselage with its axis extending transversely thereof, a wing mounted on said pivot and tiltable about said axis, two thrust-producers mounted on said wing, the projections of the thrust-lines of said thrust-producers onto a plane perpendicular to said tilt-axis being spaced apart, and control means adapted differentially to vary the thrusts of said thrust-producers, whereby a difference in magnitude of the thrusts of said thrust-producers creates a moment tending to tilt said wing with respect to said fuselage.

3. In an aircraft, a fuselage, a pivot supported by said fuselage with its axis extending transversely thereof, a structure for supporting thrust-producers mounted to tilt about said axis, two thrust-producers mounted on said supporting structure, the projections of the thrust-lines of said thrust-producers on a plane perpendicular to said tilt-axis being spaced apart, and control means adapted differentially to vary the thrusts of said thrust-producers, whereby a difference in the magnitudes of the thrusts of said thrust-producers produces a moment tending to tilt said supporting structure with respect to said fuselage.

4. In an aircraft capable of vertical and horizontal flight, a fuselage, a pivot on said fuselage, a supporting structure mounted on said pivot, two thrust-producers mounted on said supporting structure, said thrust-producers being spaced apart relative to the axis of said pivot generally horizontally during the vertical flight of said aircraft and generally vertically during the horizontal flight of said aircraft, and control means adapted differentially to vary the thrusts of said thrust-producers, whereby a controllable moment is produced between said supporting structure and said fuselage in relation to each other for assisting in the transition between vertical and horizontal flight.

5. In an aircraft, a fuselage, a wing pivotally mounted on said fuselage, two thrust-producers mounted on said wing, the thrust-lines of said thrust-producers being located on opposite sides of the median plane of said wing, and control means adapted differentially to vary the thrusts of said thrust-producers, whereby a moment tending to tilt said wing in relation to said fuselage may be produced and controlled.

6. In an aircraft, a wing, a plurality of thrust-producers fixed in position relative to said wing and spaced apart transversely in relation to the median plane of said wing, a fuselage pivotally suspended from said wing, and control means adapted differentially to vary the thrusts of said thrust-producers for producing a moment between said wing and said fuselage in relation to each other for controlling the incidence of one in relation to the other.

7. In an aircraft, a fuselage, a pivot on said fuselage, a wing mounted on said pivot, a plurality of thrust-producers mounted on said wing, the thrust-lines of said thrust-producers being spaced apart relative to the axis of said pivot in a direction transversely of the median plane of said wing, and control means adapted differentially to vary the thrusts of said thrust-producers for producing a moment between said fuselage and said wing in relation to each other for tilting one in relation to the other.

8. In an aircraft, a fuselage, a wing pivotally mounted on said fuselage, a plurality of engines mounted in pods distributed on opposite sides of the median plane of said wing, and control means adapted differentially to vary the thrusts produced by said engines for producing a moment between said fuselage and said wing in relation to each other for tilting one in relation to the other.

9. In an aircraft, a fuselage, a wing pivotally mounted on said fuselage, a plurality of propellers mounted on said wing with their rotation axes spaced apart transversely of the median plane of said wing, power-transmission means interconnecting said propellers, a power-plant connected to said power-transmission means, and control means adapted differentially to vary the pitches of said spaced-apart propellers for producing a moment between said fuselage and said wing in relation to each other for tilting one in relation to the other.

10. In an aircraft, a fuselage, a pivot on said fuselage, a wing mounted on said pivot, two propellers mounted on said wing with their rotation axes spaced apart relative to the axis of said pivot in a direction transversely of the median plane of said wing, power-transmission means interconnecting said propellers, a power-plant connected to said transmission means, and control means adapted differentially to vary the pitches of said propellers for producing a moment between said fuselage and said wing in relation to each other for tilting one in relation to the other.

References Cited in the file of this patent

UNITED STATES PATENTS

| | | |
|---|---|---|
| D. 137,938 | Maycen | May 16, 1944 |
| 1,671,865 | Karish | May 29, 1928 |
| 1,871,015 | Squires | Aug. 9, 1932 |
| 1,891,166 | Leupold | Dec. 13, 1932 |
| 2,288,820 | Mas | July 7, 1942 |

FOREIGN PATENTS

| | | |
|---|---|---|
| 506,664 | Belgium | May 21, 1954 |
| 729,026 | France | Mar. 10, 1931 |
| 793,426 | France | Apr. 16, 1935 |